Figure 2:
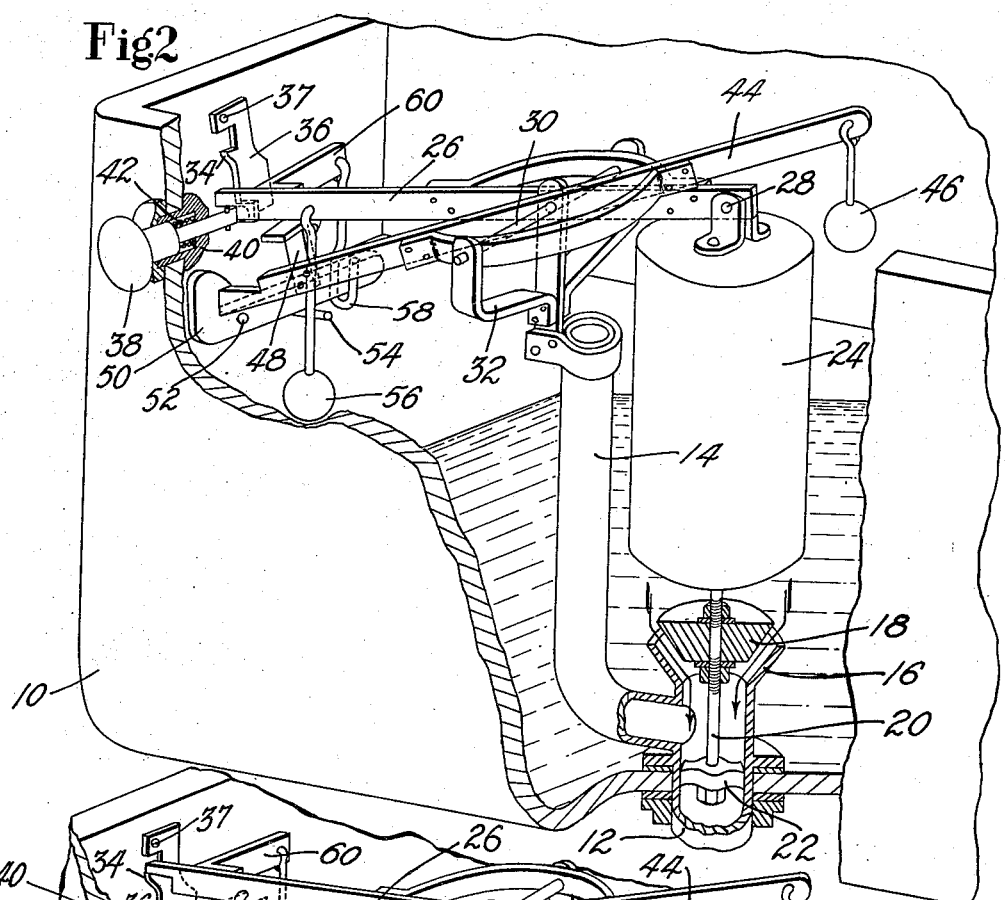

Oct. 29, 1940.    S. JOHNSON    2,219,367

FLUSH TANK

Filed June 1, 1939

INVENTOR

Spencer Johnson

Patented Oct. 29, 1940

2,219,367

UNITED STATES PATENT OFFICE 2,219,367

FLUSH TANK

Spencer Johnson, Needham, Mass.

Application June 1, 1939, Serial No. 276,843

4 Claims. (Cl. 4—57)

This invention relates to improvements in valve mechanism and is herein illustrated as embodied in a flush tank, although it is to be understood that my invention may have application in connection with any instance of the use of a manually or automatically operated valve for permitting the flow of a fluid from a tank of any type.

In the construction of flush tanks it has been proposed to employ an outlet valve, which, upon being opened to a sufficient extent to cause its lower surface to be immersed in the water flowing from the tank, acquires a buoyant property which thereafter assists in or effects the movement of the valve to its "open" position. However, in discharging such a tank it is necessary to apply a substantial force to lift or open the valve in the first instance against the water pressure over it before the buoyant effect is established. This requirement gives rise to uncertainty in the operation of such tanks, whether manually or automatically actuated, and causes considerable inconvenience to the operator of a manually operated tank.

Moreover, in an attempt to overcome the difficulty referred to above, the water pressure over the valve, which is utilized to hold it closed, may be partially counterbalanced, as by the use of a buoyant member; but any substantial gain made by the use of such means in facilitating the opening of the valve renders the seating of the valve so insecure as to make the use of this expedient impracticable.

In view of the foregoing, it is a general object of my invention to provide a valve mechanism the operation of which is effected by a minimum of effort on the part of the operator and which is not subject to delay or uncertainty in the opening or closing of the valve.

In the attainment of this object, the invention provides, in connection with a tank having an outlet valve which is normally held closed by the pressure of water over it, means connected to the valve, tending normally to move with a force substantially in excess of the water pressure on the valve in a direction such as to open the valve, and control means normally preventing the application of any force on the valve tending to open it but operable by a slight force on the part of the operator to permit the valve operating means to open the valve.

Preferably, and as herein illustrated the valve operating means comprises, as a feature of the invention, a float which is energized by being immersed below its normal level of flotation in the tank, the control means referred to above being constructed and arranged to hold the float thus submerged, so that no force is exerted upon the valve tending to open it, until the control means is actuated for this purpose. Thus, there is provided with a valve adapted to be securely seated, valve operating means which when once released is effective of itself to open the valve quickly and surely without requiring any substantial effort on the part of the operator.

Other features of the invention reside in the construction of the valve operating means and include operator controlled connections for actuating the float operating means and also a mechanism for insuring the resetting of the above-mentioned connections in their operative position after having been operated to cause the valve to be opened.

These and other features of the invention will appear more fully from the following detailed description when read in connection with the accompanying drawing and will be pointed out in the appended claims.

Figure 1:
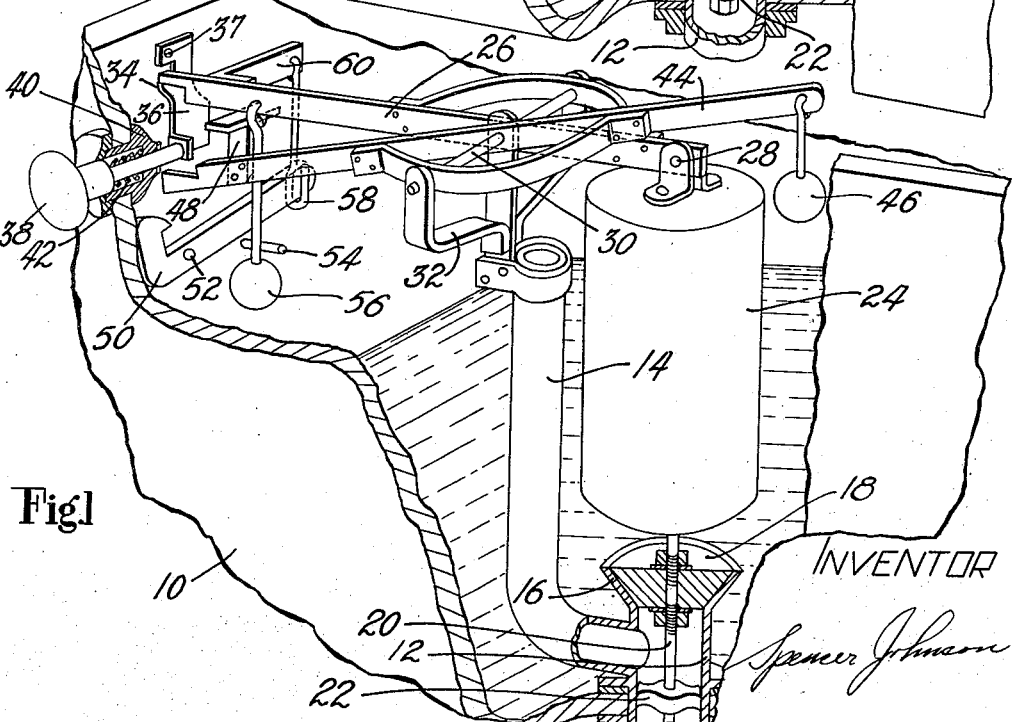

In the drawing,

Fig. 1 is a view in perspective of an illustrative flush tank embodying the invention, the sides of the tank being broken away to show the valve mechanism in its normal position, the tank being full of water and ready to be discharged, and Fig. 2 is a perspective view similar to Fig. 1 illustrating the position of the valve mechanism immediately after being operated to discharge the tank.

The tank 10 itself is of usual construction and is provided with an outlet 12 fixed to the base of the tank by a watertight connection and having associated therewith an overflow pipe 14 extending upwardly to a height corresponding to the safe water level in the tank. Water is supplied to the tank through a common type of float operated valve which operates independently of the outlet valve mechanism provided by the invention, and hence is not illustrated or described herein.

The upper portion of the outlet 12 is flared outwardly to form a seat 16 adapted to receive a valve 18 carried by a rod 20 on the lower end of which is fixed a pilot 22 adapted to slide within the outlet and to aline the valve 18 with the seat 16. The valve 18, as is usual in devices of this type, is normally held closed by the pressure of the water thereover.

Although ordinarily it is necessary for the operator of the tank to overcome this pressure on the valve in opening it, in the use of the illustrated tank, the force necessary to lift the valve 18 is provided by a bouyant float 24, the bouyant force of which, when the tank is full, is substantially greater than the combined effect of the water pressure acting downwardly on the valve and its own weight, the float normally being prevented from exerting any force on the valve except when it is desired to discharge the tank. The float 24 is thus energized when the tank is full by being held below its normal level of flotation by means comprising an arm 26 pivoted at 28 to a bracket fixed to the top of the float, the arm 26 being pivotally mounted on a rod 30 which is carried by a forked strut 32 attached to the top of the overflow pipe 14. The left-hand end of the arm 26 is adapted normally to engage a shoulder 34 on a latch 36 which is pivotally mounted at 37 on the end wall of the tank. The arm 26 is thus normally prevented by the latch 36 from swinging in response to the bouyant force of the float 24 which is held submerged until the latch 36 is operated, as will be described below, when it is desired to open the valve. A connection (not shown) is provided between the rod 20 and the bottom of the float 24 with sufficient play so as normally not to allow the float to exert any upward force on the valve whereby the pressure of the water over it is utilized to hold it closed.

When it is desired to discharge the tank, the latch 36 is swung rearwardly, to release the arm 26, by an operator controlled plunger 38 which is mounted to slide into engagement with the lower end of the latch in a bushing 40 which houses a spring 42 adapted to urge the plunger 38 toward its outermost position. The float 24 then suddenly rises lifting the valve 18 from the seat 16 until the left-hand end of the arm 26 engages the plunger 38 as a stop, whereupon the flow of water from the tank begins. The above-mentioned rising movement of the float 24 is utilized to energize a device which will presently be described for insuring the resetting of the arm 26 and latch 36 when the tank is empty.

This device comprises a second arm 44 pivoted on the rod 30 and carrying at its right-hand end a weight 46 which tends to cause the arm 44 to swing in a clockwise direction so as normally to hold a pad 48 fixed to the arm 44 against the lower side of the arm 26. Thus, when the float 24 is released to open the valve, the arm 44 is swung in a counterclockwise direction by the arm 26 and into engagement with a latch 50 which is pivoted at 52 on the end wall of the tank and holds the left-hand end of the arm 44 down when, as the water level in the tank falls, the arm 26 swings back in a clockwise direction toward its position as illustrated in Fig. 1. The latch 50 tends to swing under the force of gravity into its operative position as determined by a stop 54 fixed on the end wall of the tank.

The combined weight of the valve 18 and the float 24 is so counterbalanced by a weight 56 attached to the left-hand end of the arm 26 that the float 24 tends to float substantially on the surface of the water in the tank. Accordingly, the valve 18 and its operating mechanism will be held in their positions, as illustrated in Fig. 2, until the level of the water has fallen to that of the bottom of the float. However, as the water level drops further, the float drops with it and toward the end of this movement of the float, when the tank is nearly empty, a hook 58, which is suspended from the outer end of a bracket 60 attached to the arm 26, engages the latch 50 and swings it out of engagement with the arm 44. The arm 44 then swings under the influence of the weight 46 in a clockwise direction the pad 48 impinging upon the arm 26, whereby the momentum of the arm 44 and weight 46 are utilized to carry the left-hand end of the arm 26 definitely above the shoulder 34 of the latch 36 thereby insuring their re-engagement. By this time the valve 18 is re-engaged with its seat 16, closing the outlet 12, and the above-mentioned supply valve will have been operated to admit a new supply of water to the tank. As the water level in the tank now rises, the float 24 is again energized but is prevented by the arm 26 from lifting the valve 18, which is held closed by the water pressure over it, until the plunger 38 is again operated to cause the latch 36 to release the arm 26.

To summarize briefly the operation of the illustrated tank, assuming it to be full of water and ready to be discharged, the operator presses the plunger 38 to swing the latch 36 away from the arm 26 thereby releasing the float 24. The float then suddenly rises because of its buoyancy, overcomes the water pressure over the valve 18, and lifts it from its seat 16 whereupon the tank is discharged. It will now be apparent that the operator is relieved of the necessity of lifting the valve against the water pressure over it and has merely to overcome the friction between the latch 36 and the arm 26. The upward movement of the float 24 causes the arm 44 to be swung into engagement with the latch 50, the arm being held in its position as illustrated in Fig. 2 until the water level in the tank drops substantially to the level of the top of the valve seat 16. However, toward the end of the downward movement of the float which begins when the level of the water approaches the level of the bottom of the float as illustrated in Fig. 2, the hook 58 swings the latch 50 out of engagement with the arm 44 which then swings in a clockwise direction and strikes the arm 26 elevating its left-hand end to such an extent that the latch 36 is free to swing into its operative position, if the arm 26 has not already become re-engaged with the latch. The valve mechanism now being again in its normal condition, as illustrated in Fig. 1, the valve 18 will have re-engaged its seat 16 and the tank is again ready to receive a new supply of water from the supply valve referred to above.

Having thus described my invention, what I claim as new and desire to secure by Letters Patent of the United States is:

1. In a flush tank having an outlet valve and valve operating means comprising a latch and an arm having an initial movement when said valve is opened and a reversed movement as the tank is emptied, a member adapted to be energized by the initial movement of said arm, means operable at the end of the initial movement of said arm to hold said member in its energized position, and means actuated by the reversed movement of said arm for releasing said member whereby it is caused to impinge upon said arm to insure the re-engagement of said latch and arm.

2. In a flush tank, an outlet valve, means for operating said valve comprising a latch and an arm having an initial movement when said valve is opened and a reversed movement as the tank is emptied, a weighted member disposed in the path of said arm and adapted to be moved by said arm so that its center of gravity is raised during the initial movement of said arm, means for preventing said member from following said arm during its reversed movement, and connections between said last mentioned means and said arm for releasing said member whereby it is permitted to carry said arm into operative relation with respect to said latch.

3. In a flush tank, an outlet valve, a float for opening said valve, a lever connected to said float, a latch cooperating with said lever normally to prevent said float from opening said valve and operable to release said float, said lever having an opening movement as said float rises to its normal level of flotation followed by a closing movement while said float falls with the water level as the tank is emptied, a member disposed in the path of said lever and arranged to resist its opening movement, and means for preventing the return of said member with said lever during the closing movement of the latter, said means being operable at the end of said closing movement to release said member whereby it is caused to impinge upon said lever to insure its re-engagement with said latch.

4. In a flush tank having an outlet valve, and valve operating means comprising a latch and a lever having an initial swinging movement when said valve is opened followed by a reversed movement as the tank is emptied, a second lever arranged yieldingly to resist the initial movement of the first mentioned lever whereby the said second lever is energized during the said initial movement, a second latch for holding said second lever in its energized position, and connections between said second latch and said first mentioned lever for releasing said second lever at the end of the reversed movement of said first mentioned lever whereby the latter is carried into operative relation to said first mentioned latch by said second lever.

SPENCER JOHNSON.